(12) United States Patent
Dering et al.

(10) Patent No.: US 6,690,707 B1
(45) Date of Patent: Feb. 10, 2004

(54) PLASMA ASSISTED OXYGEN-IODINE LASER

(75) Inventors: John P. Dering, Lakewood, CA (US); Genyvieve A. Donne, Rolling Hills Estates, CA (US); James Thomas, Aliso Viejo, CA (US)

(73) Assignee: Scientific Applications and Research Associates, Inc., Cypress, CA (US)

( * ) Notice: Subject to any disclaimer, the term of this patent is extended or adjusted under 35 U.S.C. 154(b) by 0 days.

(21) Appl. No.: 10/294,334

(22) Filed: Nov. 14, 2002

(51) Int. Cl.[7] .............................. H01S 3/095; H01S 3/22
(52) U.S. Cl. ................... 372/89; 372/55; 372/22
(58) Field of Search ......................... 372/55, 89, 22

(56) References Cited

U.S. PATENT DOCUMENTS 5,889,807 A * 3/1999 Cunningham et al. ........ 372/55
6,501,780 B2 * 12/2002 Carroll et al. ................ 372/55

* cited by examiner

Primary Examiner—Paul Ip
Assistant Examiner—Hung Vy
(74) Attorney, Agent, or Firm—Murphey & Murphey, A.P.C.

(57) ABSTRACT

A process of producing a high energy chemical oxygen-iodine laser, including the steps of obtaining a quantity of oxygen in the singlet delta energy state $[O_2(a^1\Delta)]$, combining the $O_2(a^1\Delta)$ with a quantity of non-reactive carrier gas, combining the singlet delta oxygen and carrier gas with a non-reactive iodine donor gas and homogenizing the entire mixture, creating and maintaining an electrical discharge plasma downstream from a nozzle, passing the homogenized mixture through the nozzle and the discharge plasma at supersonic speeds to dissociate the iodine into free iodine atoms and directing the flow of gasses and free iodine atoms into the optical cavity laser action region of a laser.

18 Claims, 2 Drawing Sheets

PLASMA ASSISTED OXYGEN-IODINE LASER

This invention was made with Government support under Contract Number F29601-01-C-0171 awarded by the U.S. Air Force. The Government has certain rights in the invention.

BACKGROUND OF THE INVENTION

1. Field of the Invention

This invention pertains to the field of lasers. More particularly, it pertains to a method and apparatus to perform the method of using electrical energy-generated plasma in a chemical oxygen-iodine laser (known as a "COIL") to reduce the loss of energy generally encountered in the dissociation process of $I_2$ that inherently robs energy from interaction with oxygen in the singlet delta state.

2. Description of the Prior Art

Lasers (an acronym for Light Amplification by Stimulated Emission of Radiation) are devices producing intense, coherent and typically highly directional beams of light. Lasers are based upon the fundamental process of stimulated emission, a process by which a collection of atoms, molecules, ions or other medium actually amplifies light energy. This amplification occurs due to an interaction in which the light field interacting with the excited atoms induces them to radiate light precisely in phase with the optical input signal being amplified. The condition under which light amplification can occur is referred to as a "population inversion". This description broadly applies to a condition in which the excited population density exceeds that of a lower level. This population inversion can be created through numerous pumping processes, chemical, optical, electrical, and others. An inverted population amplifies spontaneous emission leading to the effects of stimulated emission, light amplification and oscillation, sort of chain or domino effect, by which one atom's emission of light quanta (photon) induces subsequent atoms to emit at the same frequency, in phase with and contributing to the initial optical emission. This process is the basic process of stimulated emission and is in general necessary to all laser systems.

Lasers (as an engineering device), in general, consist of three major sub-systems, (1)the light amplifying medium (gain medium), (2) the energy/power supply or "pump source", "pumping process" or laser pump mechanism, that introduces energy into the gain medium and allows for light amplification, and (3) the optical resonator, or optical cavity laser that allows for laser oscillation to build up and a coherent optical laser beam to be extracted for various applications. Lasers have multiple variations on the type of gain media, the energy source and the optical resonator system.

All lasers require some form of energy to pump or excite the gain medium and create the population inversion needed for laser action (called "lasing"). Chemical lasers directly utilize energy released by a gas phase chemical reaction to create the atomic or molecular population inversion needed for a laser device.

Atomic iodine lasers were demonstrated relatively early in the era of laser technology in about 1964. The earlier atomic iodine lasers were characterized by near infrared emission and generally only in brief pulses. These lasers were usually pumped through an optical process involving intense flash-lamps to dissociate an iodine compound and lead to the excited iodine. In general, these lasers were pulsed and were of interest for research involving short duration, very powerful optical pulses for studying laser/matter interactions at high intensity. Beginning in the late 1970's the consideration was given for chemical reaction schemes for producing the excited atomic iodine laser state for high average power, military class lasers (high energy laser "HEL" weapons).

A particular chemical laser is the chemical oxygen iodine laser or simply the "oxygen-iodine" laser. This system is complex, and requires some explanation of the overall process. Chemical energy is utilized in a complex reaction between an excited state of molecular oxygen and atomic iodine. The excited state of molecular oxygen is called a "singlet delta state" of oxygen and is designated in molecular spectroscopic terms as "$O_2(a^1\Delta)$". $O_2(a^1\Delta)$ may be produced by a wide variety of reactions. A common production reaction is that between basic hydrogen peroxide (hydrogen peroxide with an alkaline hydroxide, such as potassium hydroxide, added) and chlorine gas. There are other known methods of producing the excited state of molecular oxygen $O_2(a^1\Delta)$ that include chemical, electrical and optical means and hybrids of them. This invention does not require any specific means of producing singlet delta state oxygen.

There are other gasses that may be combined with atomic iodine in a gas laser. One such gas is the excited state of molecular nitrogen chloride, known as "singlet nitrogen chloride" and is designated in molecular spectroscopic terms as "$NCl(a^1\Delta)$". This singlet nitrogen chloride is also useful in the instant invention.

The optimal energy transfer partner atom is atomic iodine. This excited state is not, by itself, suited to laser operation. However, it can be mixed with another gas, and through collisions transfer it's excitation energy to an atom suited for laser action. Such a scheme is called "collisional resonant energy transfer". Such lasers use an excited energy "donor" species to transfer energy (through molecular to atomic collision) to a receptor species (the actual lasing species).

The chemical oxygen-iodine laser (known as a "COIL") was first demonstrated as a chemical laser system in 1978–79. The laser showed promise for scaling to high average powers. However, a problem with the COIL system was recognized at this early development phase.

The iodine atom must first be generated by the dissociation of molecular iodine vapor. This is done in conventional COIL systems by injecting $I_2$ vapor into a flow of $O_2(a^1\Delta)$. In a complex and not fully understood process, anywhere from four to seven separate $O_2(a^1\Delta)$ excited molecules sequentially collide with the $I_2$, each depositing excitation energy before the $I_2$ chemical bond is finally overcome, and free iodine produced. This process, while providing atomic iodine needed for lasing, also very significantly depletes the energy stored in the $O_2(a^1\Delta)$ excited state flow. Energy depleted from the $O_2(a^1\Delta)$ population and flow field results in a loss in laser power. Estimates are that up to 15% of the chemical energy potentially available for high power laser output is lost by this inefficient iodine dissociation step to generate free iodine atoms. The remaining portion of un-depleted $O_2(a^1\Delta)$ is then used to actually pump iodine atoms on the 1.315 micron, near infrared, laser transition. A micron=1 micrometer or 1 millionth of a meter and is a standard unit of optical wavelength).

The conventional COIL system is typically configured as a supersonic flow laser. Subsonic flow versions of COIL devices have also been demonstrated. In this configuration, helium, or other inert and $O_2(a^1\Delta)$ are expanded from a higher pressure "plenum" through a supersonic nozzle.

Molecular iodine vapor is injected at or near the nozzle throat and the conventional mixing/dissociation process occurs. Subsonic flow versions of COIL devices have also been demonstrated. In conventional existing COIL systems the design uses a helium carrier gas for the chemically generated excited $O_2(a^1\Delta)$ state. This mixture of helium and excited oxygen is transported to the nozzle or throat of a supersonic expansion nozzle. Molecular iodine is injected into the expanding $O_2(a^1\Delta)$+ helium flow at or near the nozzle throat. This mixing results in a complex multi-step reaction by which four to seven separate $O_2(a^1\Delta)$ molecules are required to break up one iodine molecule of $I_2$. This robs the COIL system of useful $O_2(a^1\Delta)$ to drive the laser process with iodine atoms. As a result the energy and power output of a COIL device can be decreased by a substantial amount (about 15%) compared with what should be possible, were all of the $O_2(a^1\Delta)$ made available for powering iodine atom laser action.

Further, the mixing and injection of the molecular iodine into the expanding $O_2(a^1\Delta)$ and helium gas flow results in complex gas density variation patterns that extend into the optical laser region of the flow. This injection process is a result of the need to mix the iodine into the expanding $O_2(a^1\Delta)$ flow in the nozzle at the last possible stage prior to gas flow into the optical cavity or lasing zone. Any attempt to homogenize the gas mixture by pre-mixing the iodine and excited oxygen $O_2(a^1\Delta)$ triggers the dissociation mechanism and oxygen energy depletion. Traces of water vapor from the $O_2(a^1\Delta)$ chemical formation process act as deactivators for the excited states. This deactivation rate is proportional to the square of the local pressure. Thus, mixing oxygen in the $O_2(a^1\Delta)$ state with iodine at higher pressures, such as 500 torr up to atmospheric pressure, results in large energy losses for laser action. A "torr" is a standard unit of pressure equal to 1,333.22 microbars or the pressure needed to support a column of mercury one millimeter high under standard conditions. Thus, due to $I_2$ energy reactions and dissociation processes with $O_2(a^1\Delta)$, along with attendant high pressure dependent water vapor and iodine deactivation losses, the present COIL technology must rely on injection of $I_2$ in the nozzle throat to allow for time to dissociate the $I_2$ while attempting to minimize the $O_2(a^1\Delta)$ depletion losses. This regime of operation results in attempting to balance contradictory conditions to avoid additional losses to laser performance.

In summary, the problems presently existing in prior art conventional COIL lasers include depletion of the $O_2(a^1\Delta)$ energy donor molecules by the $I_2 \rightarrow 2I$ atoms dissociation process resulting in an overall loss to the extraction of chemical energy as laser light output and further efficiency loss in laser performance by the inability to mix all $O_2(a^1\Delta)$ excited energy donors with I-atoms (incomplete mixing) in the complex supersonic flow field of COIL technology.

SUMMARY OF THE INVENTION

This invention is a method, and an apparatus for performing the method, for significantly reducing and, in some cases, eliminating, the above-described problems with COIL lasers. The process includes the steps of obtaining a quantity of oxygen in the singlet delta energy state $[O_2(a^1\Delta)]$, mixing $O_2(a^1\Delta)$ with a quantity of non-reactive carrier gas to produce a homogeneous mixture, combining this mixture with a non-reactive iodine donor gas just prior to passing the entire combination through a supersonic nozzle, creating an electrical discharge plasma downstream from the supersonic nozzle, passing the combination of gasses through the supersonic nozzle and the discharge plasma at high mass flows and velocities to dissociate the iodine into free iodine atoms and direct the flow of gasses and free iodine atoms from the discharge plasma into the optical cavity laser action region of the laser.

The suitable non-reactive iodine donor compound is preferably mixed with the $O_2(a^1\Delta)$ and the helium in a plenum chamber in order to obtain homogeneity of the combination. The non-reactive iodine donor compound is chosen that has no reactions with the energetic $O_2(a^1\Delta)$. The resultant mixture is now homogeneous and expands through the nozzle to support the high mass flow of the gasses as in a conventional supersonic flow chemical iodine laser. The discharge plasma is carefully selected to maximize iodine atom yield by optimized plasma dissociation of the iodine compound. The gas mixture exits the nozzle, now with free iodine atoms generated by flowing through the RF plasma zone, for entrance into the optical cavity laser action region. The plasma is achieved by locating at least a pair of spaced-apart RF (radio frequency) or DC (direct current) electrodes within the nozzle or at the nozzle exit and energizing them with electrical (radio frequency or direct current) energy.

Accordingly, the main object of this invention is a process for increasing the power of a COIL by dissociating the iodine molecule with radio frequency energy thus preventing loss of energy from the excited oxygen stream. Other objects and benefits of the invention include removal of gain medium optical quality distortions created by prior art methods of injecting and mixing heavy $I_2$ into the energetic $O_2(a^1\Delta)$ flow that results in disruptions to the gain medium optical density and further results in beam quality distortions that lead to a decreased intensity and focus capability of the output beam; a method for reducing the loss of excited oxygen $O_2(a^1\Delta)$ during the dissociation reaction of $I_2 \rightarrow 2I$ atoms; a method of achieving more homogeneity in the mixture of $O_2(a^1\Delta)$, $I_2$ and carrier gas; and, a method of relieving the attenuation of the laser reaction by the presence of water vapor.

These and other objects of the invention will become more clear when one reads the following specification, taken together with the drawings that are attached hereto. The scope of protection sought by the inventors may be gleaned from a fair reading of the Claims that conclude this specification.

DESCRIPTION OF THE PREFERRED EMBODIMENT

Figure 1:
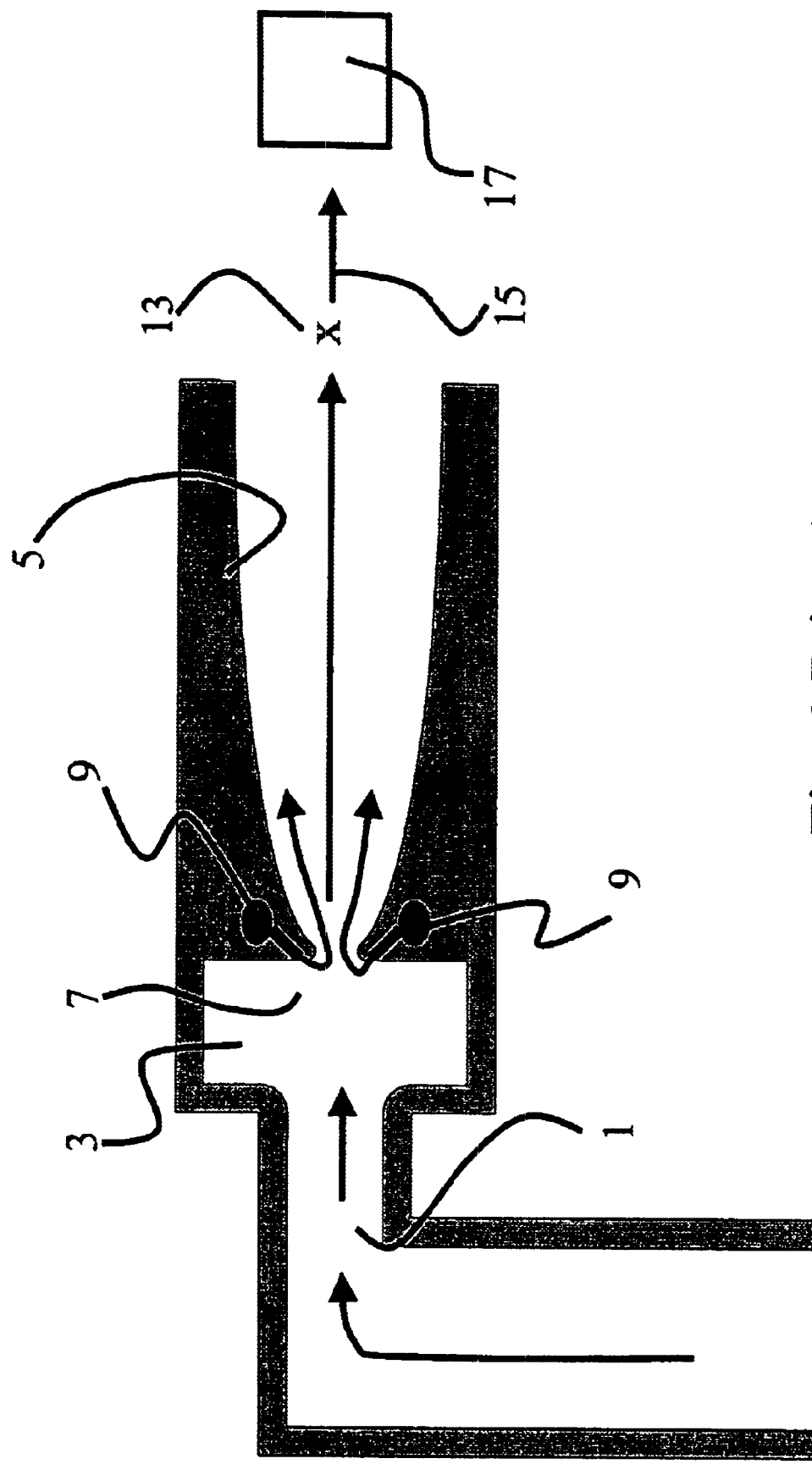
FIG. 1 is a conceptual diagram of the prior art supersonic nozzle-apparatus showing how the various components are assembled to handle introduction of $I_2$, $O_2(a^1\Delta)$ and the carrier gas on their way to the laser cavity; and, FIG. 2 is a schematic diagram of the invention showing how the various components are arranged for introduction of the novel materials disclosed herein into the supersonic nozzle on their way to the laser cavity.

Turning now to the drawings, wherein elements are identified by numbers and like elements are identified by like numbers throughout the two figures, FIG. 1 shows a conventional prior art chemical oxygen iodine laser (COIL) and shows a duct 1 for carrying a flow of a mixture of a volume of a non-reactive carrier gas, such as helium, and a volume of $O_2(a^1\Delta)$. Carrier gasses other than helium are usable herein as long as they do not react with the $O_2(a^1\Delta)$. Gasses such as Argon, Krypton, Neon, and Xenon are usable as carrier gasses. However, helium is the gas by choice, based upon its availability and relatively low cost, while Krypton, Neon and Xenon are undesirable because of cost and availability. Argon may be used, however, it is not as readily available and is more costly to obtain. Nitrogen may be used in some cases. The gas is a called a "carrier" gas in that it is generally inert and non-reactive with $O_2(a^1\Delta)$ and/or $NCl(a^1\Delta)$.

The $O_2(a^1\Delta)$ may be obtained from a variety of production methods, such as the reaction of hydrogen peroxide (with an alkaline hydroxide added) and chlorine gas. Other methods such as electrical production, photo-chemical production and even nuclear energy formation are useful and may be used in this invention. The flow of the $O_2(a^1\Delta)$/helium mixture is shown by the arrows in duct 1. The mixture of $O_2(a^1\Delta)$ and helium carrier gas is introduced into a nozzle plenum 3 through duct 1 where it turbulates to homogenize the gasses.

Plenum 3 passes into a nozzle 5 through a nozzle throat 7. In throat 7 is provided at least one, but typically a plurality of inlets or injectors 9 through which is passed molecular iodine ($I_2$) vapor for introduction into the $O_2(a^1\Delta)$/helium stream. The excited $O_2(a^1\Delta)$/helium mixture is introduced into nozzle plenum 3. As it passes through throat 7, iodine vapor is introduced through injectors 9 to combine with the $O_2(a^1\Delta)$/helium stream. Subsequent expansion of this combination of $O_2(a^1\Delta)$/helium/iodine stream mixture through nozzle 5 is directed into the laser optical cavity 13 where it initiates the standard COIL operation. It is at this point that four to seven molecules of singlet oxygen $O_2(a^1\Delta)$ are consumed with each $I_2$ molecule in order to split the molecules into atoms of iodine [$I_2 \rightarrow 2I$]. This has been the point at which approximately 15% of the $O_2(a^1\Delta)$ is consumed in the process and is withdrawn from further involvement in producing the oxygen-iodine laser.

As the laser action proceeds, the helium/$O_2(a^1\Delta)$/$I_2$ gas mixture is then discharged through nozzle 5 to the optical cavity region 13 which is shown in FIG. 1 as an "x" indicating that the axis proceeds into the plain of the drawing. From there, the mixture proceeds, in the direction of arrow 15, to a standard pressure recovery vacuum system 17, the details of which are not shown as its make-up is known in the prior art.

Figure 2:
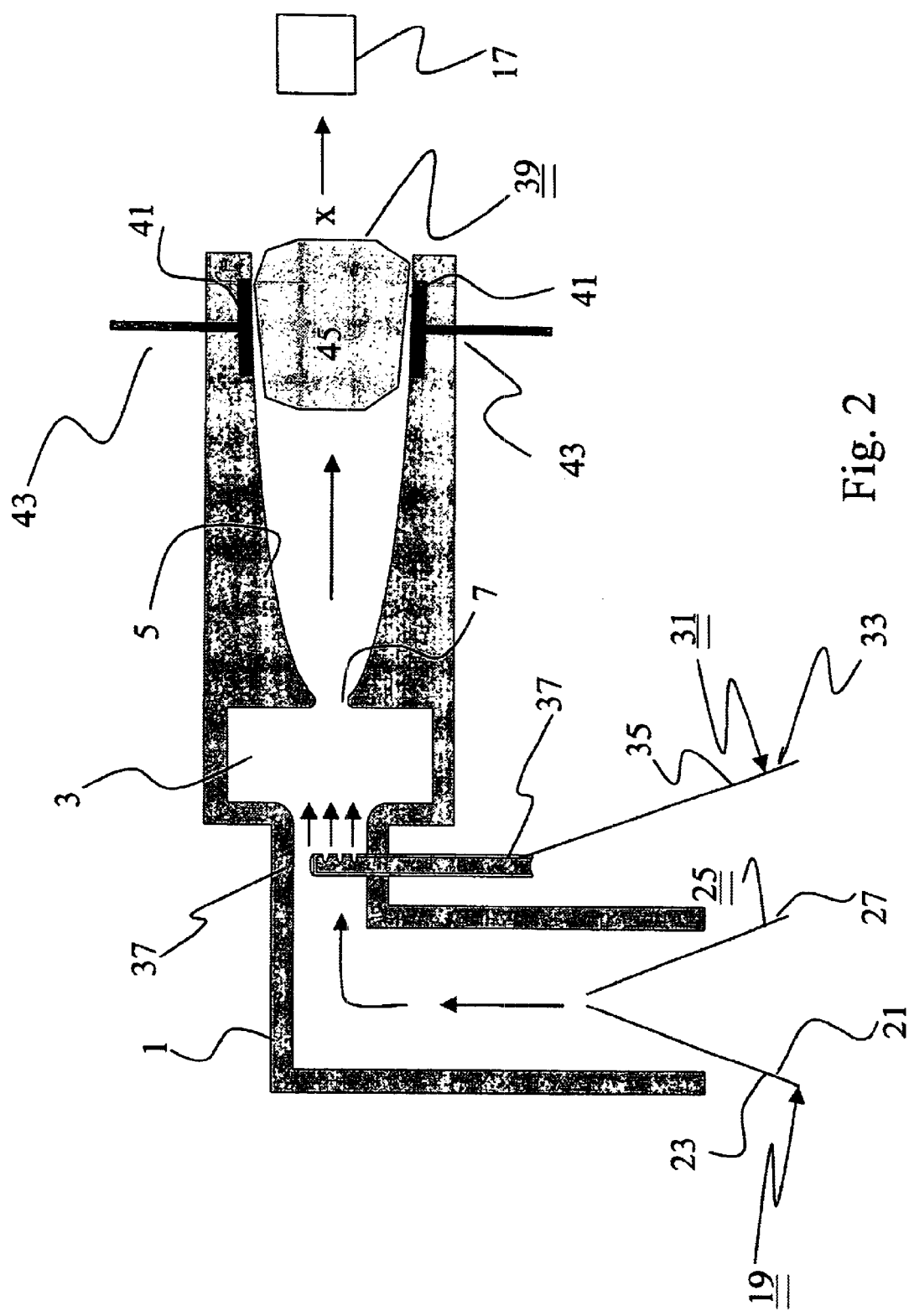

Shown in FIG. 2 is the chemical oxygen-iodine (COIL) laser improved by the teachings of this invention. As shown, the apparatus comprises a first means 19 provided for generating a quantity of oxygen in the singlet delta energy state [$O_2(a^1\Delta)$]. Like the prior art device of FIG. 1, this can be any of a number of known generators such as that shown in U.S. Pat. No. 5,974,072 and generally includes a first large tank/singlet oxygen generator (SOG) 21 wherein a process such as hydrogen peroxide (hydrogen peroxide with an added alkaline hydroxide such as potassium hydroxide) and chlorine gas are mixed to form $O_2(a^1\Delta)$ as the primary product. The singlet delta energy state [$O_2(a^1\Delta)$] gas is transferred by a duct 23 into duct 1.

A second means 25 is provided, such as a second large tank 27, for holding a quantity of a non-reactive carrier gas, such as helium. As earlier stated, other inert and non-reactive [with $O_2(a^1\Delta)$] carrier gasses may be used but economics dictates helium and passing this gas a duct 29 into duct 1. The respective ratios of the gasses are generally centered around 4:1 helium:$O_2(a^1\Delta)$ for typical COIL operating conditions.

A third means 31 is provided, such as a third tank 33, for holding a quantity of non-reactive iodine donor gas, such as methyl iodide ($CH_3I$), for transporting it through a duct 35 and passing it, through injectors 37, for injecting it into nozzle plenum 3 and mixing with the $O_2(a^1\Delta)$/helium mixture coming in through duct 1. The type of non-reactive iodine donor gasses useful in this invention are those that are not dissocated by $O_2(a^1\Delta)$ and do not deactivate or quench the energetic $O_2(a^1\Delta)$. Other suitable iodine source compounds are those that are inert to singlet delta oxygen, $O_2(a^1\Delta)$, but dissociate in a plasma and include diodomethane $C_2H_2I_2$ and other iodine substituted alkane hydrocarbons, as well as per-fluor-methyl iodide $CF_3I$ and other per-fluor-alkyl iodides. Molecular iodine $I_2$ may be used under some circumstances.

A fourth means 39 for creating an electrical discharge plasma downstream from nozzle 5, is provided and is shown in the form of a pair of radio frequency (RF) or direct current (DC) electrodes 41 located in spaced-apart arrangement downstream from nozzle 5. More than one pair of electrodes 41 may be used, depending upon a number of factors, such as the size of nozzle 5 and the overall size of the laser. Electrodes 41 are charged, through power source feeds 43 with energy from a conventional RF amplifier power source (not shown) or conventional direct current electrical power source (not shown) to create and sustain a plasma zone 43 as shown in FIG. 2. Direct current power densities as low as 2 watts/cm$^2$ of electrode (plate) area have been shown to produce sufficient plasma to dissociate the molecular iodine to atomic iodine [$I_2 \rightarrow 2I$]. For RF energy, rates ranging from 50 KHz upwards toward 100 MHz. have proven effective.

The flow of homogenized singlet delta oxygen/carrier gas mixture/non-reactive iodine donor gas is passed through nozzle 5 at supersonic speeds so that the iodine donor is dissociated by the radio frequency energy or direct current energy into free iodine atoms without the use of $O_2(a^1\Delta)$ thus allowing all of the $O_2(a^1\Delta)$ to be used to generate laser action. Thereafter, the produced homogeneous mixture of $O_2(a^1\Delta)$/iodine donor/2I/helium is directed into the optical cavity laser action region 13 of the laser. From there, the mixture proceeds, in the direction of arrow 15, to a standard pressure recovery vacuum system 17 (not shown).

The means for mixing the $O_2(a^1\Delta)$ with a quantity of non-reactive carrier gas, and later combining that mixture with the non-reactive iodine donor gas, may include mixing propellers 47 located inside the tanks and the plenum chamber as shown in dotted outline in FIG. 2.

The steps in this inventive process include obtaining a quantity of oxygen in the singlet delta energy state [$O_2(a^1\Delta)$], combining the $O_2(a^1\Delta)$ with a quantity of non-reactive carrier gas, combining the singlet delta oxygen and carrier gas with a non-reactive iodine donor gas, creating and maintaining an electrical discharge plasma downstream from a nozzle, passing the homogenized mixture through the nozzle and plasma discharge and discharging the plasma at supersonic speeds. The nozzle directs the gas flow through the iodine plasma dissociation zone and into the optical cavity lasing region. The high volume capacity vacuum and pressure recovery system 17 maintain the pressure differential across nozzle 5 needed for supersonic flow and the lasing action.

Thus, a re-capture of the stored chemical energy latent in the excited singlet delta oxygen population, and lost by the iodine dissociation sequence, is possible with this invention. The invention can eliminate the need for complex molecular iodine vapor injection schemes now used in present COIL systems. The benefits from this invention are an increase in the homogeneity of the optical gain/lasing medium. In essence, pre-mixing of the iodine donor compound with the excited oxygen and the controlled RF or DC plasma dissociation allows for a uniform mixture of iodine donor compound with the excited oxygen energy donor molecules appearing in the lasing region. The flow field artifacts of molecular iodine vapor injection and incomplete mixing with excited oxygen are minimized or eliminated by this invention. A uniform medium presents a uniform optical path, assuring a high quality laser beam is extracted from the flowing laser mixture. Further, this invention of plasma generation of iodine atoms, where they are needed, is entirely compatible with chemical iodine lasers using new excited oxygen generation methods (new chemistries, electrical methods, photo-chemical or even nuclear energy formation of singlet delta oxygen). Similarly the invention is also fully compatible with alternate energy donor molecules for pumping iodine such as excited singlet delta nitrogen mono-chloride.

While the invention has been described with reference to a particular embodiment, those skilled in the art will be able to make various modifications to the described embodiment of the invention without departing from the true spirit and scope thereof. It is intended that all combinations of elements and steps which perform substantially the same function in substantially the same way to achieve substantially the same result are within the scope of this invention.

What is claimed is:

1. A process of producing a high energy chemical oxygen-iodine laser, comprising the steps of:
    obtaining a quantity of oxygen in the singlet delta oxygen energy state;
    combining said $O_2(a^1\Delta)$ with a quantity of non-reactive, inert carrier gas;
    combining said singlet delta oxygen and carrier gas with a non-reactive iodine donor gas and homogenizing the entire mixture before said mixture enters a supersonic nozzle throat;
    initiating and sustaining a plasma discharge in the region downstream of the nozzle for dissociation of the non-reactive iodine compound and production of atomic iodine in the cavity and,
    directing said flow of gasses and free iodine atoms into the optical cavity to allow for laser action via singlet delta oxygen transfer for discharge generating atomic iodine thus allowing laser action in the resonator region of a laser.

2. The process of producing a high energy chemical oxygen-iodine laser of claim 1 wherein the non-reactive carrier gas is selected from the group consisting of helium, argon, neon, krypton and xenon.

3. The process of producing a high energy chemical oxygen-iodine laser of claim 1 wherein the non-reactive carrier gas is nitrogen.

4. The process of a high energy chemical oxygen-iodine laser of claim 1 wherein said quantity of oxygen in the singlet delta energy state $[O_2(a^1\Delta)]$ is produced by the standard reaction of chlorine gas and basic hydrogen peroxide.

5. The process of producing a high energy chemical oxygen-iodine laser of claim 1 wherein the step of combining said $O_2(a^1\Delta)$ with a quantity of non-reactive carrier gas includes the step of combining said $O_2(a^1\Delta)$ with helium in a homogeneous mixture prior to the introduction of an iodine donor compound that is inert to said $O_2(a^1\Delta)$.

6. The process of producing a high energy chemical oxygen-iodine laser of claim 1 wherein the step of mixing said carrier gas and said $O_2(a^1\Delta)$ with a non-reactive iodine donor gas includes the step of mixing said carrier gas and said $O_2(a^1\Delta)$ with gaseous methyl iodide.

7. The process of producing a high energy chemical oxygen-iodine laser of claim 1 wherein the step of creating an electrical discharge plasma downstream from a nozzle includes the steps of:
    a) mounting electrodes in the nozzle side walls near the exit region of the nozzle but ahead of the laser action region; and,
    b) energizing said electrodes with a radio frequency or a direct electric energy field to create an electrical discharge (glow discharge) plasma in the gas-flowing stream of the carrier gas, the $O_2(a^1\Delta)$, and iodine bearing compound.

8. The process of producing a high energy chemical oxygen-iodine laser of claim 2 wherein said quantity of oxygen in the singlet delta energy state $[O_2(a^1\Delta)]$ is produced by the reaction of chlorine gas and basic hydrogen peroxide.

9. The process of producing a high energy chemical oxygen-iodine laser of claim 1 wherein the step of combining said $O_2(a^1\Delta)$ with a quantity of inert, non-reactive carrier gas includes the step of combining said $O_2(a^1\Delta)$ with helium in a homogeneous mixture.

10. The process of producing a high energy chemical oxygen-iodine laser of claim 1 wherein the step of mixing said carrier gas and said $O_2(a^1\Delta)$ with a non-reactive iodine donor gas includes the step of mixing said carrier gas and said $O_2(a^1\Delta)$ with gaseous methyl iodide selected from the group consisting of methyl iodide, diodo-methane iodine, and alkane hydrocarbon substituted iodine.

11. The process of producing a high energy chemical oxygen-iodine laser of claim 1 wherein the step of creating an electrical discharge plasma downstream from a nozzle includes the steps of:
    a) mounting at least a pair of electrodes in spaced-apart arrangement in the nozzle side walls near the exit region of the nozzle but ahead of the laser action region; and,
    b) energizing said electrodes with a low power radio frequency field to create and maintain an electrical discharge (glow discharge) plasma in the gas flowing stream of the carrier gas, the $O_2(a^1\Delta)$, and the iodine-bearing compound.

12. An apparatus for producing a high energy chemical oxygen-iodine laser comprising:
    a means for obtaining a quantity of oxygen in the singlet delta energy state $[O_2(a^1\Delta)]$;
    means for combining said $O_2(a^1\Delta)$ with a quantity of non-reactive carrier gas to create a uniformly mixed gas species mixture;
    means for combining said singlet delta oxygen and carrier gas with a non-reactive iodine donor gas and homogenizing the entire mixture;
    nozzle means and means for creating and maintaining an electrical discharge plasma downstream from said nozzle wherein the electrical discharge plasma dissociates molecular iodine into atomic iodine;
    means for passing said uniformly mixed gas species mixture of said singlet delta oxygen, said carrier gas and said non-reactive iodine donor gas through said nozzle and said discharge plasma at a high speed to dissociate the iodine into free iodine atoms; and
    means for directing said flow of gasses and free iodine atoms into the optical cavity laser action region of a laser.

13. The apparatus for producing a high energy chemical oxygen-iodine laser of claim 12 wherein said means for obtaining a quantity of oxygen in the singlet delta energy state [$O_2(a^1\Delta)$] comprises a singlet oxygen generator.

14. The apparatus for producing a high energy chemical oxygen-iodine laser of claim 12 wherein said means for combining said $O_2(a^1\Delta)$ with a quantity of non-reactive carrier gas comprises a mixer.

15. The apparatus for producing a high energy chemical oxygen-iodine laser of claim 12 wherein said means for mixing said carrier gas and said $O_2(a^1\Delta)$ with a non-reactive iodine donor gas and homogenizing the entire mixture comprises a plenum chamber located ahead of said nozzle into which all three gasses are introduced and intermix.

16. The apparatus for producing a high energy chemical oxygen-iodine laser of claim 12 wherein said means for creating and maintaining an electrical discharge plasma downstream from a nozzle includes at least a pair of electrodes in spaced-apart arrangement in said nozzle near the exit of said nozzle and means for inputting to said electrodes radio frequency energy or direct electrical current sufficient to generate and maintain said discharge plasma.

17. The apparatus for producing a high energy chemical oxygen-iodine laser of claim 12 wherein said means for passing said homogenized mixture through said nozzle and said discharge plasma at high speed is accomplished by maintaining a pressure differential between said homogenized mixture in said nozzle and laser optical cavity.

18. The apparatus for producing a high energy chemical oxygen-iodine laser of claim 12 wherein said nozzle, through which said flow of gasses and free iodine atoms pass, on their way to said optical cavity laser action region of said laser, comprises a nozzle having a design that will raise the speed of the passing gasses into the supersonic range.

* * * * *